Figure 1:
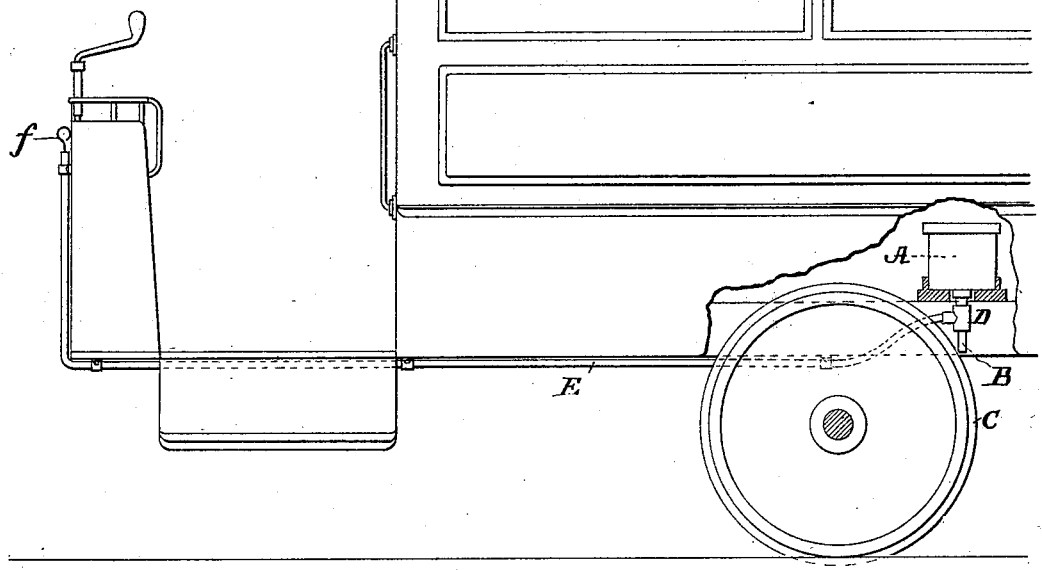

(No Model.)

S. M. BRIGGS.
DEVICE FOR LUBRICATING CAR WHEELS.

No. 397,168. Patented Feb. 5, 1889.

Attest:
Walter Scott.
J. Thomas Latham

Inventor:
Samuel M. Briggs.
By Paine & Ladd, attys.

UNITED STATES PATENT OFFICE.

SAMUEL M. BRIGGS, OF WASHINGTON, DISTRICT OF COLUMBIA.

DEVICE FOR LUBRICATING CAR-WHEELS.

SPECIFICATION forming part of Letters Patent No. 397,168, dated February 5, 1889.

Application filed October 2, 1888. Serial No. 286,944. (No model.)

*To all whom it may concern:*

Be it known that I, SAMUEL M. BRIGGS, a citizen of the United States, residing at Washington, in the District of Columbia, have invented certain new and useful Improvements in the Lubrication of Car-Wheels on Curves; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is to provide means for the lubrication of the flanges of car-wheels when turning curves.

It is well known that in turning curves, especially on city surface roads, where short curves have of necessity to be used, the traction required is very great. Owing to the fact that car-wheels are made fast to the axles, a pair of wheels have to turn together, and as the bearings for the axles have no longitudinal play one or both of the wheels have to slip on the rails in turning a curve. To relieve the great strain on the traction-power on curves, and to save the wear of rails and car-wheel flanges, it has even been proposed to provide one of the rails at a curve with friction-rollers or to make it movable on a turn-table, and another expedient sometimes resorted to is to grease the rails. It has also been proposed to provide means on the car, under the control of the driver or engineer, whereby he can lubricate the rails at such points as he may desire.

My invention serves to accomplish the result by lubricating the flanges of the wheel, means being provided on the car, under the control of a driver or engineer, so that when desired the lubricator can be applied, and when not needed it can be withheld. In this way the lubrication is applied to the wheel itself, and not to the rail, as has heretofore been the practice, so that it is not necessary for lubricating material to be applied to the entire length of the track on the curve. It is sufficient for the flange of the wheel to be lubricated during one revolution of the wheel, and this answers for the entire curve, thereby saving the waste of an unnecessary amount of oil, and also producing a better effect. For example, on a descending grade the lubricating of the wheel-flanges is not necessary or desirable, but on upgrades it is very important—especially on horse-cars is its want felt; and my invention consists, essentially, of an oil-reservoir on the car, a pipe leading therefrom to a point in close proximity to the flange or line of one or more of the wheels, and provided with a valve and a wire or rod so located as to be within easy reach of the driver or engineer, by means of which the lubricant can be applied.

Figure 2:
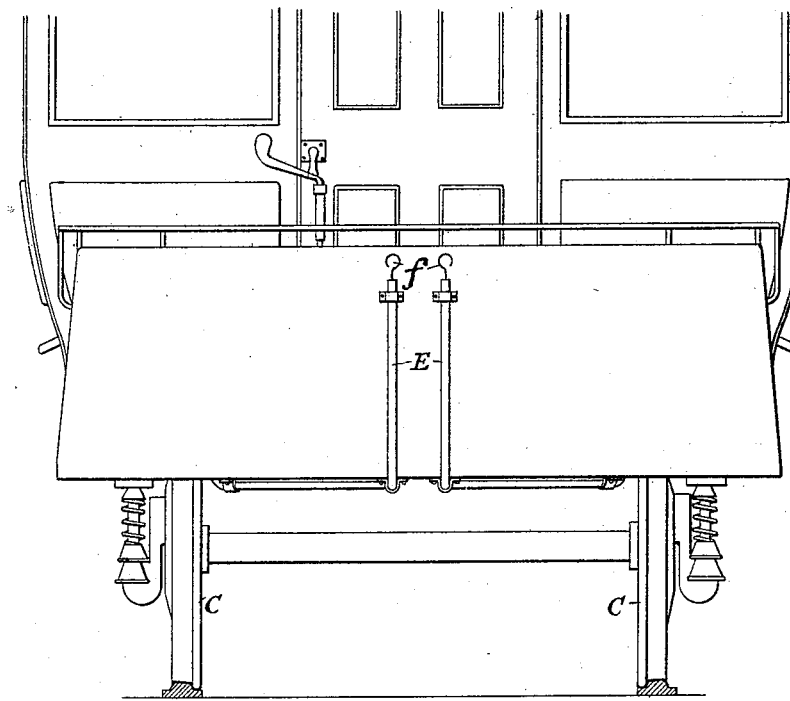
Figure 3:
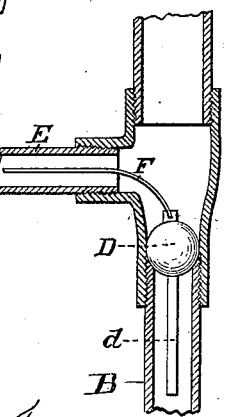

Figure 1 shows a sectional view of a car having the apparatus attached; Fig. 2, a front view of the same; and Fig. 3 is a sectional view of the valve.

A is an oil-reservoir. In the case of horse-cars it is preferably placed within the car under the seat, where it will be out of sight and at the same time easily accessible for filling.

B is a pipe leading therefrom and terminating at a point close to the flange of one of the wheels C.

D is a valve in this pipe. (Shown in detail in Fig. 3.)

E is a pipe leading from a point just above the valve forward to the dash-board and then up to a point near the top thereof.

F is a wire or chain connected to the valve and passing through the pipe E, and provided with a cross-bar or handle, *f*, which rests on top of the open end of the pipe E within easy reach of the hand of the driver.

Lubricating devices are provided for both car-wheels, and their respective pipes E and operating wires or chains F are brought together in front, so that both can be operated at the same time by the driver, or one only, as required. Similar devices may be applied to the car-wheels at both ends of the car; but in operation it is ordinarily only necessary to lubricate the forward wheels, as through them the rail is sufficiently lubricated for the time being. The valve D is a heavy ball-valve having a guide-stem, *d*, and the wire or chain fastened to the top thereof.

The operation of the device will be readily understood. When it is desired to lubricate the wheel-face, the driver simply reaches over his dash-board, pulls the valve of one or both of the lubricators open for an instant by means of the respective handles, and then lets them go. Sufficient oil flows down onto the wheel-flange to accomplish the object and the wheels slip easily and freely on the track. If desired, a measuring-valve may be employed which will deliver each time the operating-handle is pulled a fixed quantity of lubricant to the wheels.

What I claim as new is—

1. The combination, with the wheel of a car, of a lubricator having its discharge-opening located above the wheel and in close proximity to the flange or face thereof, so as to discharge the lubricant thereon, substantially as set forth.

2. The combination, with a wheel of a car, of a lubricator having its discharge-pipe located above the wheel or in close proximity to the flange or face thereof, so as to discharge the lubricant thereon, and an operating-handle conveniently located to be operated by the driver or engineer, substantially as and for the purpose set forth.

3. The combination, with a car, of an oil-reservoir, A, having a discharge-pipe, B, located in close proximity to the flange of a wheel, the valve D, and pipe E, with wire or chain F, substantially as and for the purpose set forth.

In testimony whereof I affix my signature in presence of two witnesses.

SAMUEL M. BRIGGS.

Witnesses:
  CHAS. A. ELLIOT,
  RUTLEDGE WILSON.